United States Patent [19]

Branson et al.

[11] 4,357,748

[45] * Nov. 9, 1982

[54] FLUID FLOW SENSING SWITCH DEVICE METHOD OF MAKING THE SAME

[75] Inventors: Charles D. Branson; Roy C. Demi, both of Greensburg, Pa.

[73] Assignee: Robertshaw Controls Company, Richmond, Va.

[ * ] Notice: The portion of the term of this patent subsequent to Dec. 30, 1997, has been disclaimed.

[21] Appl. No.: 186,163

[22] Filed: Sep. 11, 1980

Related U.S. Application Data

[62] Division of Ser. No. 936,112, Aug. 23, 1978, Pat. No. 4,242,082.

[51] Int. Cl.³ .......... H01M 11/00

[52] U.S. Cl. .......... 29/622; 137/503; 200/83 A; 200/83 F; 200/83 Q; 200/83 N; 251/61.3

[58] Field of Search .......... 29/622; 200/83 R, 83 A, 200/83 L, 83 F, 83 Q, 83 N, 61.86; 137/111, 119, 503; 251/61.3

[56] References Cited

U.S. PATENT DOCUMENTS

| | | | |
|---|---|---|---|
| 1,931,475 | 10/1933 | Broskh et al. | 200/83 A X |
| 1,938,327 | 12/1933 | Green | 200/83 Q |
| 2,800,599 | 7/1957 | Caparone | 200/61.86 |
| 3,164,414 | 1/1965 | Stelzer | 200/83 Q |
| 3,475,746 | 10/1969 | Nelson et al. | 200/83 N X |
| 3,551,620 | 3/1969 | Hoover | 200/83 L |
| 3,898,403 | 8/1975 | Grayson et al. | 200/83 L |
| 4,000,386 | 12/1976 | Brouwer | 200/83 Q |
| 4,081,621 | 3/1978 | Hartley | 200/83 Q |
| 4,107,494 | 8/1978 | Tuegel | 200/83 L |

*Primary Examiner*—Leon Gilden
*Attorney, Agent, or Firm*—Candor, Candor & Tassone

[57] ABSTRACT

A fluid flow sensing switch device having a housing provided with a fluid flow passage therethrough defined by an inlet and an outlet separated by a valve seat controlled by a movable valve member that is operated by the pressure differential between the inlet and the outlet, the device having an electrical switch construction operatively associated with the valve member and having the switch contacts thereof actuated by the pressure differential. The switch contacts of the switch construction are disposed in the fluid flow passage so as to be exposed to fluid flow therethrough and have a part thereof carried by the valve member.

9 Claims, 6 Drawing Figures

FLUID FLOW SENSING SWITCH DEVICE METHOD OF MAKING THE SAME

CROSS-REFERENCE TO RELATED APPLICATION

This application is a divisional patent application of its copending parent application, Ser. No. 936,112, filed Aug. 23, 1978, now U.S. Pat. No. 4,242,082.

BACKGROUND OF THE INVENTION

1. Field of the Invention

This invention relates to an improved fluid flow sensing switch device and method of making the same as well as to a fuel control system utilizing such device for controlling the operation of electrical ignition means for a burner means of the fuel control system.

2. Prior Art Statement

It is known to provide a fluid flow sensing switch device having a housing means provided with a fluid flow passage therethrough defined by an inlet and an outlet separated by a valve seat controlled by a movable valve member that is operated by the pressure differential between the inlet and the outlet, the device having an electrical switch construction operatively associated with the valve member and having contact means thereof actuated by the pressure differential.

For example, see the following four United States Patents:

(1) U.S. Pat. No. 3,898,403—Grayson et al (2) U.S. Pat. No. 1,938,327—Green (3) U.S. Pat. No. 3,551,620—Hoover (4) U.S. Pat. No. 3,164,414—Stelzer.

The fluid flow sensing switch device of item (1) above, appears to be utilized in a fuel control system for a burner to operate the electrical ignition means of the burner upon a pressure drop being created between the inlet and the outlet of the fluid flow sensing switch device by the operator opening the "on-off" valve that leads to the burner, the fluid flow sensing switch device having a magnetically operated electrical switch mounted external to the main housing thereof and being controlled by the pressure differential between the inlet and the outlet in such a manner that the switch construction closes its contacts to operate the electrical ignition means before the pressure differential opens the valve member away from the valve seat to direct full fuel flow to the burner.

However, see column 5, lines 33–39, of item (1) above which states:

"Note will be taken that the magnetically operated switch may be replaced with a mercury switch or any other utilization device inside or outside the fluid housing. For example, if the mercury switch is inside the housing, pigtail electrical leads may extend completely through the housing in sealed relation thereto."

It appears that the fluid flow device of item (2) above has one of the contacts of the electrical switch thereof carried by a flexible diaphragm that controls the position of a valve member relative to the valve seat intermediate the inlet and outlet thereof, the electrical contacts of the switch construction being remote from the inlet and outlet of the device.

Similarly, the fluid flow device of item (3) appears to have a magnetically operated reed switch mounted remotely from the inlet and outlet of the device, the magnet being carried by flexible diaphragm that controls the position of the valve member relative to the valve seat that is disposed intermediate the inlet and outlet of the device.

It appears that the fluid flow device of item (4) above has a diaphragm that carries an electrical contact that will be moved with the diaphragm into electrical contact with a fixed contact when the pressure differential acting across the diaphragm increases a certain amount. Thereafter, a spring biased valve member carried by the diaphragm will open to permit fluid flow from an inlet through the diaphragm over the closed contacts and out an outlet, the fluid flow device of item (4) being for controlling the flow of compressed air therethrough for operating a trailer brake system or the like.

It is also known to provide a pneumatically operated relay having electrical contacts disposed in the chambers thereof to be engaged by a conductive diaphragm fluidically operated in the relay construction.

For example, see the following United States patent:

(5) U.S. Pat. No. 4,000,386—Brouwer

It appears that the relay of item (5) above has a conductive diaphragm that is adapted to make contact with one or more electrical contacts disposed in fluid chambers defined by the diaphragm for completing electrical logic circuits.

SUMMARY OF THE INVENTION

It is a feature of this invention to provide a fluid flow sensing switch device that is relatively compact.

In particular, it was found according to the teachings of this invention that the prior known fluid flow sensing switch devices each had the electrical switch construction thereof and means for operating the same arranged in such a manner that either separate housing means must be provided therefor, or the housing means containing the electrial switch and operating means was relatively large.

Thus, it was found according to the teachings of this invention that the contact means of the electrical switch construction could be located in the main fluid flow passage through the fluid flow sensing switch device and thereby permit the device to be relatively small and still accomplish all of the desired functions, such as operating the electrical ignition means for a burner which receives fuel flow from a source through the fluid flow sensing switch device.

Accordingly, one embodiment of this invention provides a fluid flow sensing switch device having a housing means provided with a fluid flow passage therethrough defined by an inlet and an outlet separated by a valve seat controlled by a movable valve member which is operated by a pressure differential between the inlet and the outlet, the device having an electrical switch construction operatively associated with the valve member and having contact means thereof actuated by the pressure differential. The contact means of the switch construction are disposed in the fluid flow passage so as to be exposed to fluid flow therethrough and have a part thereof carried by the valve member whereby the fluid flow sensing switch device is relatively compact.

Such fluid flow sensing switch device includes control means that is operated by the pressure differential and is operatively interconnected to the contact means and to the valve member to operate the same in such a manner that the contact means are actuated before the control means opens the valve member upon the sensing of a certain pressure drop between the inlet and the outlet of the device.

In this manner, the electrical ignition means for the burner means in a fuel control system utilizing the fluid flow sensing switch construction of this invention will be operating before fuel can issue from the burner means in order to provide for ignition thereof.

Accordingly, it is an object of this invention to provide an improved fluid flow sensing switch device having one or more of the novel features of this invention as set forth above or hereinafter shown or described.

Another object of this invention is to provide a method of making such a fluid flow sensing switch device, the method of this invention having one or more of the novel features of this invention as set forth above or hereinafter shown or described.

Another object of this invention is to provide a fuel control system utilizing such a fluid flow sensing switch device, the fuel control system of this invention having one or more of the novel features of this invention as set forth above or hereinafter shown or described.

Other objects, uses, and advantages of this invention are apparent from a reading of this description which proceeds with reference to the accompanying drawings forming a part thereof and wherein:

DESCRIPTION OF THE PREFERRED EMBODIMENT

Figure 1:
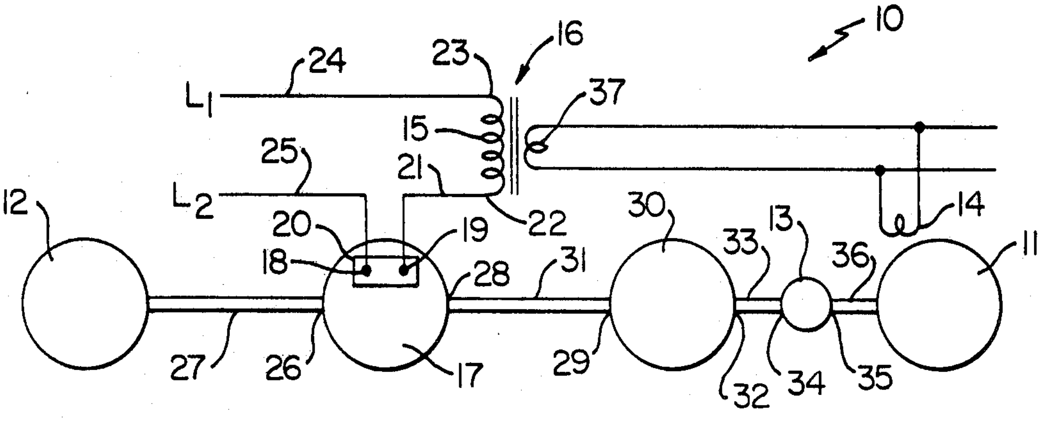
FIG. 1 is a schematic view illustrating the fuel control system of this invention utilizing the fluid flow sensing switch device of this invention.

While the various features of this invention are hereinafter described and illustrated as being particularly adapted to provide a fluid flow sensing switch device for a fuel control system, such as for a cooking apparatus or the like, it is to be understood that the various features of this invention can be utilized singly or in any combination thereof to provide a fluid flow sensing switch device for other types of apparatus as desired.

Therefore, this invention is not to be limited to only the embodiment illustrated in the drawings, because the drawings are merely utilized to illustrate one of the wide variety of uses of this invention.

Referring now to FIG. 1, the improved fuel control system of this invention is generally indicated by the reference numeral 10 and is being utilized for controlling the operation of a main burner means 11 of a cooking apparatus or the like (not shown) that is adapted to receive gaseous fuel from a fuel source 12 when a conventional "on-off" valve 13 for the burner means 11 is turned to an "on" condition thereof whereby the fuel issuing from the burner means 11 is adapted to be ignited by an electrically operated ignitor coil 14 disposed adjacent thereto and being energized when current is permitted to flow through a primary coil 15 of a transformer means 16 when a fluid flow sensing switch device 17 of this invention causes an electrical connection between a pair of contacts 18 and 19 of an electrical switch construction 20 thereof upon the sensing of a flow of fuel from the device 17 toward the burner means 11 in a manner hereinafter described.

The contact 19 of the switch construction 20 is adapted to be electrically interconnected by lead means 21 to one side 22 of the primary coil 15 of the transformer means 16 while the other side 23 of the primary coil 15 is interconnected by a lead means 24 to a main power source lead L1.

The other contact 18 of the switch construction 20 is adapted to be interconnected by a lead means 25 to the other main power source lead L2 as illustrated in FIG. 1.

The fuel source 12 is adapted to be interconnected to the inlet side 26 of the fluid flow sensing switch device 17 of this invention by a conduit means 27 while the outlet side 28 of the device 17 is adapted to be interconnected to the inlet side 29 of a conventional pressure regulator 30 by a conduit means 31. The outlet side 32 of the pressure regulator 30 is adapted to be interconnected by a conduit means 33 to the inlet side 34 of the on-off valve 13 that has its outlet side 35 interconnected by a conduit means 36 to the burner 11.

While the system 10 is illustrated as having only one burner 11 and one ignitor coil 14 respectively therefor, it is to be understood that the system 10 could have a plurality of burners 11 and each have an ignitor coil 14 therefor that is electrically interconnected to the secondary winding 37 of the transformer means 16 in any suitable manner.

For example, the ignition coils 14 can be of the type set forth in the U.S. patent to Branson, U.S. Pat. No. 4,003,360 or as set forth in the aforementioned U.S. patent to Grayson et al, U.S. Pat. No. 3,898,403.

In any event, it can be seen that the fuel control system 10 is so constructed and arranged that each time the "on-off" valve 13 is turned to an "on" condition thereof, fuel is adapted to flow from the source 12 to the burner 11, the device 17 of this invention being so constructed and arranged in a manner hereinafter set forth that the same senses the opening of the valve 13 in a manner to cause the switch contacts 18 and 19 to close to operate the ignitor 14 before the device 17 permits fuel to flow therethrough from the source 12 to the burner means 11 so that by the time the fuel flows through the pressure regulator 30 to the burner means 11 to issue therefrom, the ignition coil 14 is already operating to ignite the fuel flow. The ignitor coil 14 remains in an energized condition thereof as long as the fuel flow continuse to flow from the source 12 through the device 17 to the burner 11 as will be apparent hereinafter.

Thereafter, when the operator closes the "on-off" valve 13, the device 17 sensing the closing of the valve means 13 in a manner hereinafter set forth subsequently not only disconnects the conduits 27 and 31 from each other, but also opens the contacts 18 and 19 of the switch construction 20 to terminate the operation of the ignition coil 14.

The details of the improved fluid flow sensing switch device 17 of this invention and the method of this invention for making the same will now be described and reference is made to FIGS. 2 and 3 wherein it can be seen that the device 17 has a housing means 38 that includes an inlet 39 and an outlet 40 separated from each other by a resilient valve seat 41 that is adapted to be opened and closed by a valve member 42 movable carried by the housing means 38 in a manner hereinafter described.

In this manner, the inlet 39 and outlet 40 provide a fluid flow path through the housing means 38 adapted to be respectively interconnected to the conduits 27 and 31 for the purpose previously described.

A flexible diaphragm 43 has its outer peripheral portion 44 secured to the housing means 38 by being held between a body part 45 thereof and a cover plate 46 thereof fastened to the body part 45 by threaded fastening means 47 whereby the side 48 of the flexible diaphragm 43 cooperates with the housing part 45 to define part of the outlet 40 thereof while the other side 49 of the flexible diaphragm 43 cooperates with the cover part 46 to define a control chamber 50 therewith that is sealed from the outlet 40 by the flexible diaphragm 43.

The housing means 38 of the device 17 has an open passage 51 therein that interconnects the inlet 39 to the control chamber 50 and has a restricted passage 52 that interconnects the inlet 39 with the outlet 40 for a purpose hereinafter described.

Figure 2:
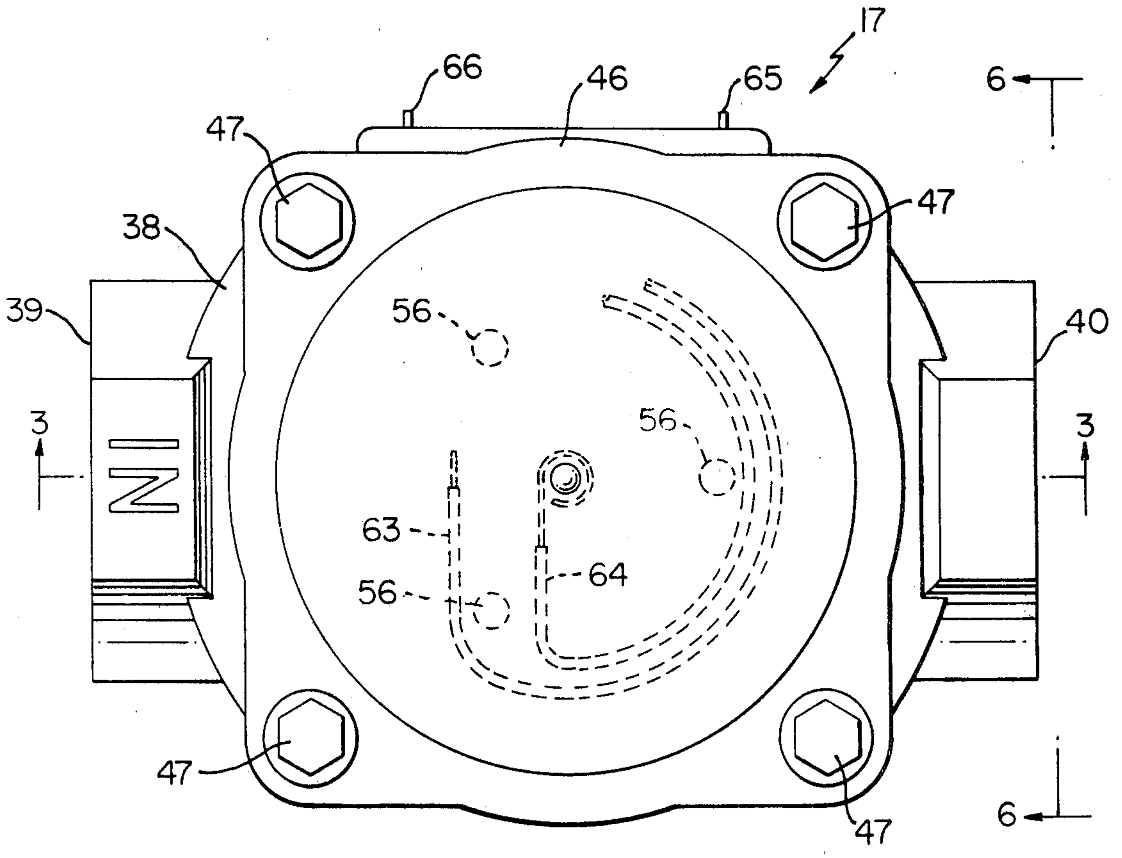
FIG. 2 is an enlarged top view of the fluid flow sensing switch device of this invention that is schematically illustrated in FIG. 1.
Figure 3:
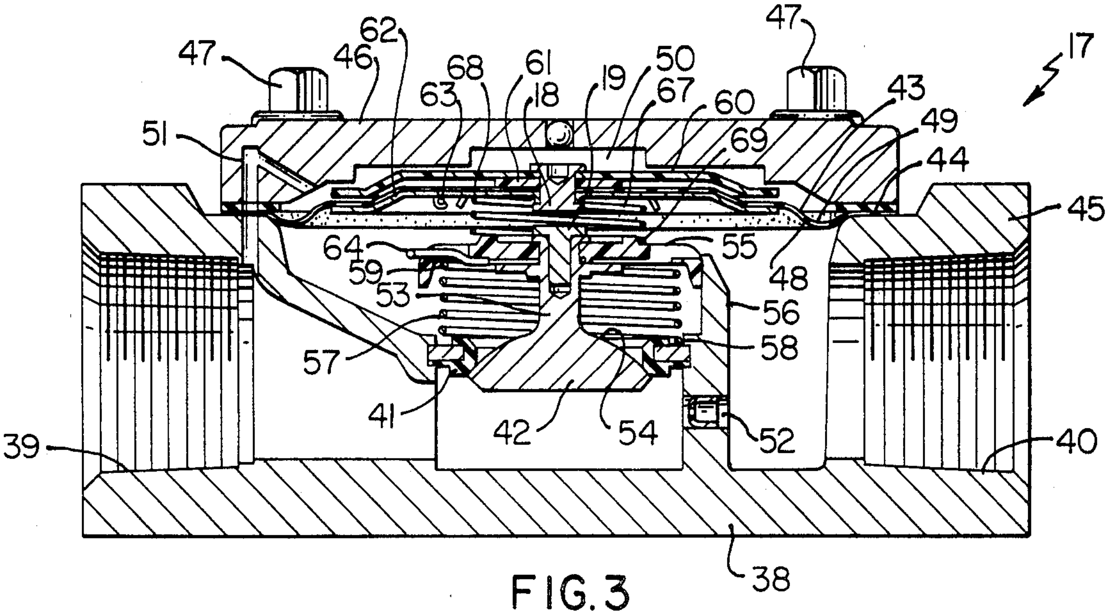
FIG. 3 is a cross-sectional view taken on line 3—3 of FIG. 2.
Figure 4:
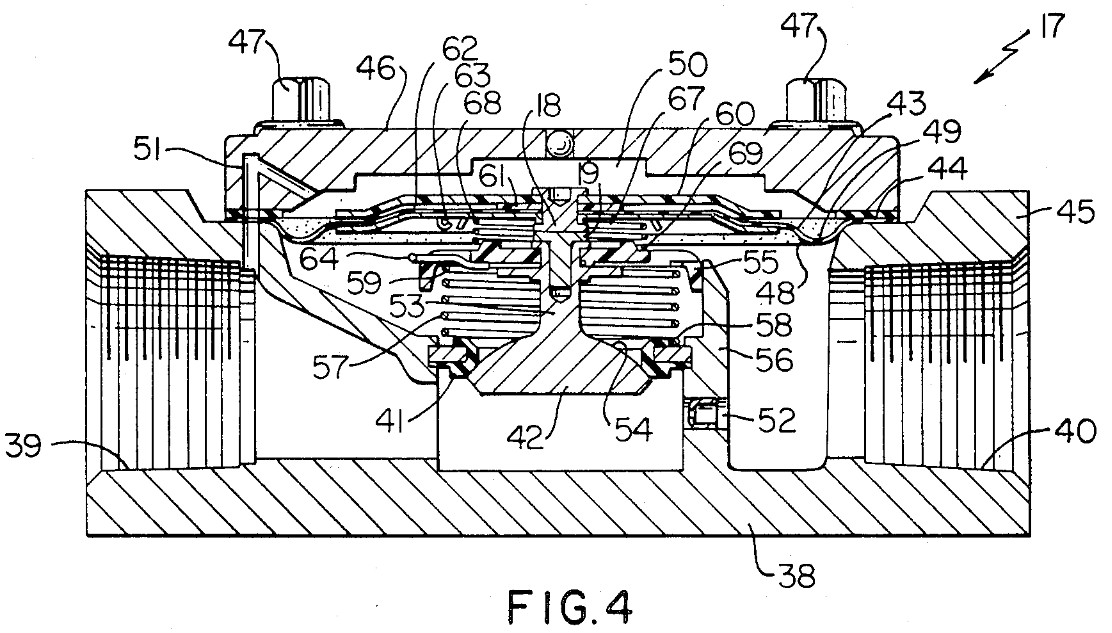
FIG. 4 is a view similar to FIG. 3 and illustrates the fluid flow sensing switch device in a different operating condition thereof.
Figure 5:
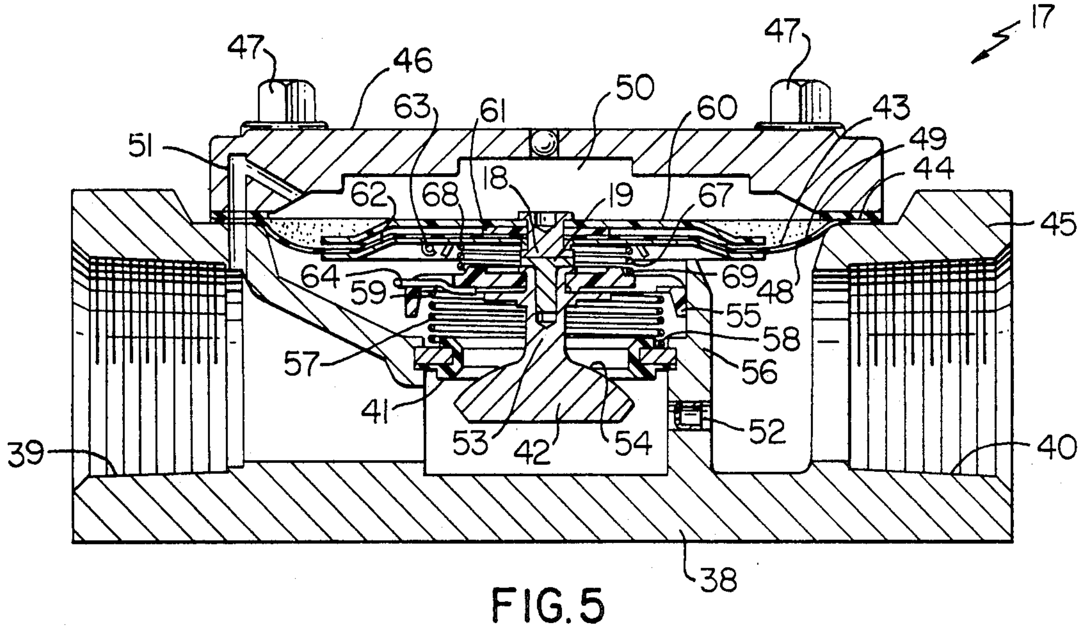
FIG. 5 is a view similar to FIGS. 3 and 4 and illustrates the fluid flow sensing device in still another operating condition thereof.

The movable valve member 42 has a stem 53 extending from the side 54 thereof and projects through the valve seat 41 to interconnect to a non-conductive guide plate 55 that is adapted to be guided in its up and down movement in FIGS. 3–5 by three upstanding ribs or guide posts 56 of the housing means 38 as illustrated in FIGS. 2 and 3.

A compression spring 57 has one end 58 bearing against the housing means 38 and the other end 49 thereof bearing against the valve member guide disc 55 so that the force of the compression spring 57 normally tends to move and hold the side 54 of the valve member 42 in its closed condition against the valve seat 41 to prevent fluid communication between the inlet 39 and outlet 40 through the valve seat 41.

The conductive stem 53 of the valve member 42 carries one of the electrical contacts 18 and 19 of the switch construction 20 previously described, and in the embodiment illustrated in FIG. 3, the contact 19 is illustrated as being carried by the valve stem 53.

The other contact 18 of the switch construction 20 is carried by the flexible diaphragm 43 and assists in fastening diaphragm plates 60, 61 and 62 to the diaphragm 43 for reinforcement purposes and the like.

Figure 6:
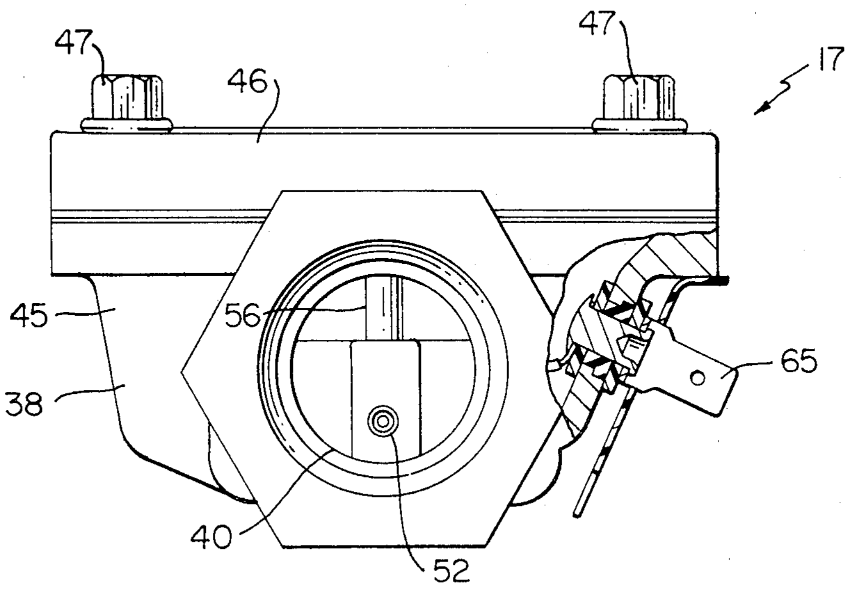
FIG. 6 is an end view of the fluid flow sensing switch device of FIG. 2, taken in the direction of the arrows 6—6 of FIG. 2, and being partially broken away.

A pair of leads 63 and 64 are respectively electrically interconnected to the contacts 18 and 19 and respectively to terminal means 65 and 66 that are carried by the housing means 38 and extend externally of the housing means 38 in the manner illustrated by the terminal means 65 in FIG. 6.

In this manner, it can be seen that the electrical contacts 18 and 19 are adapted to be respectively interconnected to the leads 25 and 21 of the system 10 by the terminals 65 and 66 whereby both contacts 18 and 19 of the switch construction 20 are disposed in the outlet 40 of the fluid flow path of the device 17 and are exposed to the fluid flow therethrough as will be apparent hereinafter whereby a separate housing means for the switch construction 20 is not required as in certain prior known devices.

A second compression spring 67 is disposed between the flexible diaphragm 43 and valve member 42 by having one end 68 thereof bearing against the diaphragm back-up plate 62 and the other end 69 thereof bearing against the non-conductive guide disc 55 of the valve member 42 whereby the force of the compression spring 67, while being less than the force of the compression spring 57, tends to separate the contacts 18 and 19 from each other in the manner illustrated in FIG. 3.

However, when the diaphragm 43 is moved downwardly in opposition to the force of the compression spring 67 in a manner hereinafter described, the contact 18 is adapted to be moved into electrical contact with the contact 19 in the manner illustrated in FIG. 4 to actuate the switch construction 20 and thereby energize the ignition coil 14 in the manner previously described before further downward movement of the diaphragm 43 causes the valve member 42 to move away from the valve seat 41 in the manner illustrated in FIG. 5, the contacts 18 and 19 remaining closed during the entire time the valve member 42 is in an open condition thereof.

Therefore, it can be seen that the fluid flow sensing switch device 17 of this invention can be formed from relatively few parts by the method of this invention to be relatively compact in size as illustrated in FIGS. 2 and 3 to operate in a manner now to be described.

When the fluid flow sensing switch device 17 of this invention is disposed in the fuel control system 10 previously described, and the "on-off" valve member 13 is in the "off" condition thereof, it can be seen that the inlet 39 of the device 17 is directly interconnected to the fuel source 12 so that the pressure of the fuel in the inlet 39 is the same as in the control chamber 50 because of the open passage 51 which tends to operate on the side 49 of the diaphragm 43 to move the same downwardly in opposition to the force of the compression springs 67 and 57. However, since the "on-off" valve 13 is in its closed condition, the outlet 40 of the device 17 is adapted to be at the same pressure as the inlet 39 as the restricted passage 52 permits the outlet 40 to increase its pressure value to the same pressure as in the inlet 39 and since the pressure in outlet 40 is now the same as the pressure in the control chamber 50, the fluid pressure on opposite sides 48 and 49 of the diaphragm 43 balance each other so that the force of the compression springs 57 and 67 hold the diaphragm 43 in its uppermost condition as illustrated in FIG. 1. Thus, not only is the valve member 42 closed against the valve seat 41, but also the contact 18 is held away from the contact 19 so that the switch construction 20 is in the open condition thereof to prevent the operation of the transformer 16 and, thus, the energizing of the ignition coil 14.

However, when the operator desires to utilize the burner means 11, the operator opens the "on-off" valve 13. The initial opening of the "on-off" valve 13 vents the pressure in the outlet 40 of the device 17 through the burner 11 so that the initial pressure drop between the inlet 39 and outlet 40 results in a corresponding pressure drop across the diaphragm 43 caused by the pressure in the control chamber 50 now being higher than in the outlet 40 because the restricted passage 52 cannot maintain the pressure in the outlet at the same rate as the open passage 51 to the control chamber 50. Thus, the diaphragm 43 is moved downwardly by the resulting pressure differential across the same in opposition to the force of the compression spring 67 until the contact 18 makes contact with the contact 19 as illustrated in FIG. 4 to cause closing of the switch construction 20 and, thus, operation of the transformer 16 to energize the ignition coil 14 in the manner previously described.

Further downward movement of the diaphragm 43, because of the pressure differential acting across the same, causes the contact 18 to move the contact 19 downward therewith in opposition to the force of the compression spring 57 which of course, causes the valve member 42 to open away from the valve seat 41 in the manner illustrated in FIG. 5 to permit fuel in sufficient quantity to now flow from the source 12 through the device 17, pressure regulator 30 and open valve means 13 to the burner 11 and be ignited by the ignitor coil 14 when the same issues therefrom.

As long as the "on-off" valve 13 remains in the "on" condition thereof, fuel continuously flows from the source 12 to the burner 11 at the pressure determined by the setting of the pressure regulator 30 and since the device 17 remains in the open condition illustrated in FIG. 5 during this time, the switch construction 20 remains in its closed condition and the ignition coil 14 remains in its energized condition.

However, should the operator subsequently close the "on-off" valve 13, the closing of the valve 13 stops the flow of fuel to burner 11 and now permits the pressure in the outlet 40 of the device 17 to build up by the fuel still passing through the open valve seat 41 until the pressure in the outlet 40 is substantially the same as the pressure in the inlet 39 and, thus, in the control chamber 50. In this manner, the pressure differential acting across the diaphragm 43 decreases so that the force of the compression spring 57 first causes the valve member 42 to close against the valve seat 41 in the manner illustrated in FIG. 4 and then further upward movement of the diaphragm 43 by the force of the compression spring 67 causes the contact 18 to move away from the contact 19 in the manner illustrated in FIG. 3 to thereby open the switch construction 20 and terminate the operation of the transformer 16 whereby the ignition coil 14 is deenergized.

Thus, as long as the "on-off" valve 13 remains in the "off" condition thereof, the pressure in the outlet 40 remains the same as the pressure in the inlet 39 because of the restricted passage 52 whereby the diaphragm 43 remains in the up condition illustrated in FIG. 3 so that not only is the valve member 42 in its closed condition against the valve seat 41, but also the switch construction 20 is in the open condition thereof.

Therefore, it can be seen that not only does the location of the contacts 18 and 19 of the switch construction 20 in the outlet 40 of the device 17 render the device 17 relatively compact, but also such arrangement of the contacts 18 and 19 readily permits the fluid flow sensing switch device 17 to close the switch construction 20 before the valve member 42 thereof is moved to an open condition relative to the valve seat 41. Conversely, such location of the contacts 18 and 19 permits the valve member 42 to close before the switch construction is opened.

Therefore, this invention not only provides an improved fluid flow sensing switch device and method of making the same, but also this invention provides an improved fuel control system utilizing such a fluid flow sensing switch device.

While the forms and methods of this invention, now preferred, have been illustrated and described as required by the Patent Statute, it is to be understood that other forms and method steps can be utilized and still fall within the scope of the appended claims.

What is claimed is:

1. In a method of making a fluid flow sensing switch device having a housing means provided with a fluid flow passage therethrough defined by an inlet and an outlet separated by a valve seat controlled by a movable valve member that is operated by the pressure differential between said inlet and said outlet acting on a flexible diaphragm carried by said housing means, said device having an electrical switch construction operatively associated with said valve member and having contact means thereof actuated by said pressure differential acting on said flexible diaphragm, the improvement comprising the steps of mounting said contact means of said switch construction in said fluid flow passage so as to be exposed to fluid flow therethrough, forming said contact means to comprise a first part thereof and a second part thereof, said step of mounting said contact means comprising the step of mounting said first part of said contact means on said valve member and mounting said second part of said contact means on said diaphragm in spaced apart relation to said first part of said contact means and being positioned to make contact with said first part of said contact means to close said switch construction upon actuation of said switch construction, operatively interconnecting control means that is operated by said differential pressure to said contact means and to said valve member to operate the same, and forming said control means with means that actuates said contact means before said control means opens said valve member upon sensing a certain pressure drop between said inlet and said outlet.

2. A method as set forth in claim 1 and including steps of forming said control means with said flexible diaphragm and mounting said flexible diaphragm to said housing means so that said diaphragm has one side thereof exposed to said outlet and the other side thereof cooperating with said housing means to define a control chamber therewith.

3. A method as set forth in claim 2 and including the step of mounting a compression spring means between and against said diaphragm and said valve member to tend to separate said first and second parts of said contact means from each other and thereby tend to maintain said switch in an open condition thereof.

4. A method as set forth in claim 3 and including the step of mounting another compression spring means between and against said housing means and said valve member to tend to move said valve member to a closed position with said valve seat.

5. A method as set forth in claim 2 and including the steps of forming said first part of said contact means from an electrical contact having lead means electrically interconnected thereto for electrical connection externally of said housing means, and forming said second part of said contact means also as an electrical contact having lead means electrically interconnected thereto for electrical connection externally of said housing means.

6. A method as set forth in claim 2 and including the step of forming said housing means with an open passage means leading from said inlet to said control chamber and with a restricted passage means leading from said inlet to said outlet.

7. A method as set forth in claim 2 and including the step of forming said first part of said contact means to comprise a single contact and said second part of said contact means to comprise a single contact.

8. A method as set forth in claim 4 and including the steps of mounting said valve seat intermediate said valve member and said diaphragm, projecting a portion of said valve member through said valve seat toward said diaphragm, and mounting said first part of said contact means on said portion of said valve member so as to be carried by said portion of said valve member.

9. A method as set forth in claim 8 and including the steps of mounting a retainer on said portion of said valve member, mounting the first mentioned compression spring between and against said diaphragm and said retainer, and mounting the second mentioned compression spring between and against said retainer and said valve seat.

* * * * *